Patented Jan. 30, 1940

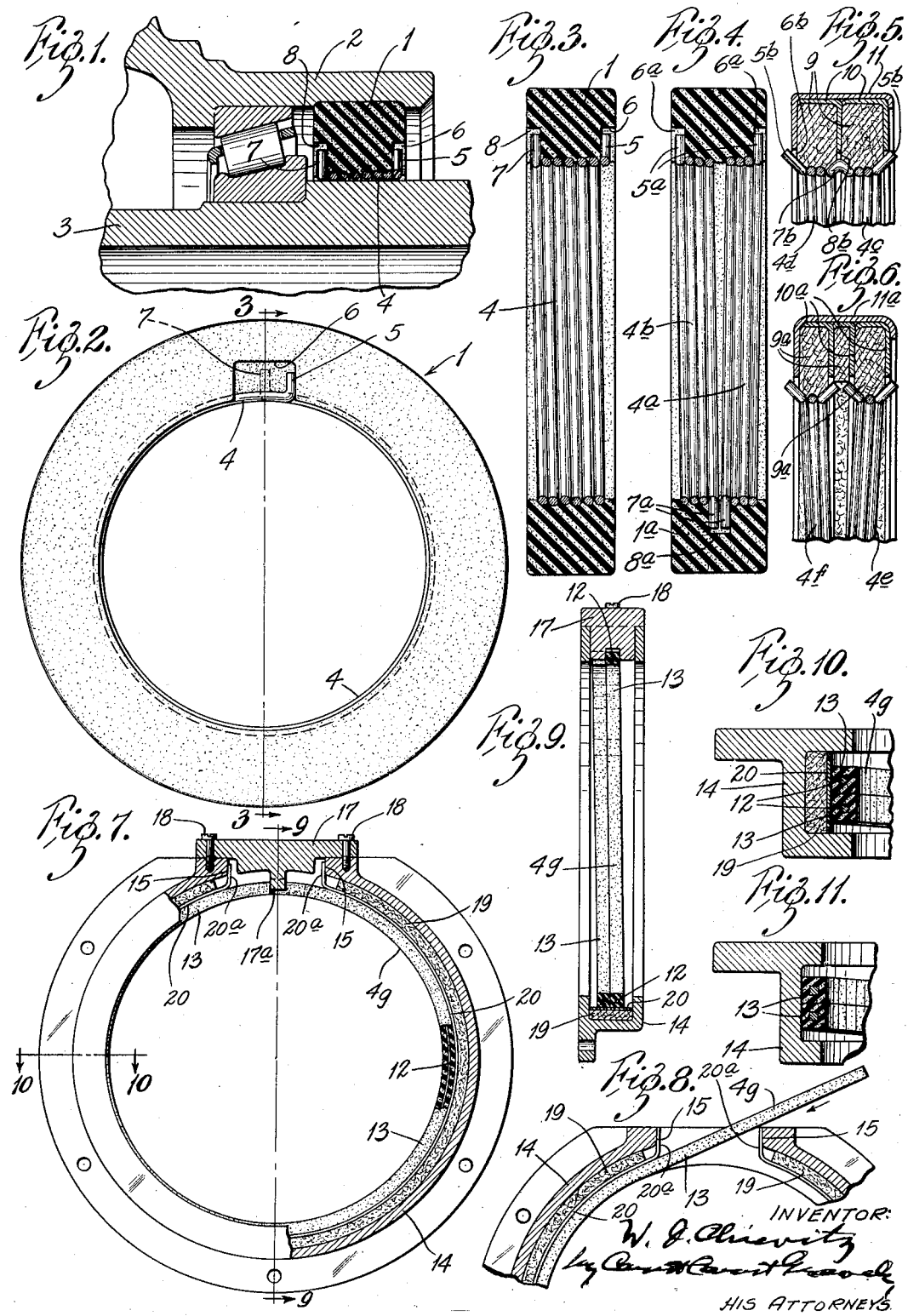

2,188,858

UNITED STATES PATENT OFFICE 2,188,858

OIL SEAL

William J. Chievitz, Canton, Ohio, assignor to The Timken Roller Bearing Company, Canton, Ohio, a corporation of Ohio Application January 8, 1938, Serial No. 183,983

7 Claims. (Cl. 286—7)

This invention relates to that type of ring-like devices that are interposed between a shaft and its housing for the purpose of preventing leakage of oil. Its principal objects are to provide an efficient sealing ring of simple, economical and compact construction, to provide for the ready insertion and removal of said ring, to facilitate replacement of worn parts thereof, and to obtain other advantages. The invention consists in the sealing ring and in the construction, combinations and arrangements of parts hereinafter described and claimed.

In the accompanying drawing, which forms part of this specification and wherein like symbols refer to like parts wherever they occur, Fig. 1 is a longitudinal sectional view of a sealing ring embodying my invention shown interposed between a rotary shaft and its housing, Fig. 2 is an end view of said ring, Fig. 3 is a central longitudinal section through said ring on the line 3—3 in Fig. 2, Fig. 4 is a view similar to Fig. 3, illustrating a modified form of sealing ring, Figs. 5 and 6 are fragmentary sections similar to Fig. 3 illustrating two additional modified forms of sealing ring, Fig. 7 is a view partly in end elevation and partly in transverse section of another modified form of sealing ring, Fig. 8 is a fragmentary section similar to Fig. 7, showing the manner of inserting the sealing wire in the ring, Fig. 9 is a section on the line 9—9 in Fig. 7, Fig. 10 is a cross-sectional view on the line 10—10 in Fig. 7; and Fig. 11 is a view similar to Fig. 10 showing a modification of the construction shown therein.

The sealing device shown in Figs. 1, 2 and 3 comprises a ring 1 of elastic material, such as Thiokol or other synthetic rubber that is substantially resistant to lubricating oil. The peripheral portion of this ring is adapted to be seated with a tight fit in a shallow groove provided therefor in the housing 2 for a shaft 3. By reason of the elasticity of the ring 1, it can be compressed sufficiently to reach such groove and, when in register therewith, the ring will expand into frictional engagement with the bottom of the groove.

Snugly fitting in the opening in the ring 1 is a helically wound wire coil 4 preferably of bronze or other antifriction metal. This coil terminates at one end in an outwardly bent portion 5 that is disposed within a relatively large recess 6 provided therefor in the adjacent end of the ring 1; and the opposite end of said coil terminates in an outwardly bent portion 7 that is loosely anchored in a recess 8 provided therefor in the corresponding end of said ring. The coil 4 is adapted to oppose the outward travel of oil along the coil receiving portion of the shaft 2, the direction in which the coil is wound depending upon the direction in which the shaft rotates.

The coil 4 is wound slightly smaller than the outside diameter of the shaft 3, so that the coil rotates with the shaft due to the friction herebetween until the bent end 5 of the coil abuts against the wall of the recess 6 provided therefor in the ring 1. The coil will then start to unwind slightly, thereby relieving the tight fit of the coil on the shaft and thus permitting the shaft to rotate independently of the coil.

The sealing device shown in Fig. 4 is intended for use with constructions wherein the shaft rotates in either direction. In this form of sealing device, the elastic ring 1a is provided at one end with a right-hand helical coil 4a and at the other end with a left-hand helical coil 4b, so that one coil operates to prevent leakage of oil when the shaft is rotated in one direction and leakage is prevented by the other coil when the shaft is rotated in the opposite direction. In this construction, each coil has an outwardly bent end portion 5a that is disposed within a recess 6a provided therefor in the corresponding end face of the ring 1a; and the inner ends of both coils terminate in outwardly bent portions 7a that are disposed within a single recess or pocket 8a provided therefor in the wall of the coil receiving opening of said ring midway of the ends thereof. In this construction, when the shaft is rotated in one direction, one end of each coil will abut against the wall of the recess provided therefor in the ring and thus cause the coil to unwind slightly and permit free slippage of the shaft in the coil; and, when the shaft is reversed, each coil will wind up or tighten until the other end thereof abuts against the wall of the other recess in said ring, whereupon the coil will again unwind and render the device operative in the opposite direction.

The sealing device shown in Fig. 5 comprises felt rings 9 that are mounted in metallic shells 10 of angular cross-section, which shells are connected together by means of an exterior metallic shell or holder 11, which embraces the two felt retaining shells. In this construction, a single length of wire is reversely wound to provide a right-hand helix 4c at one end thereof and a left-hand helix 4d at the other end thereof. At their remote ends the coils have outwardly bent portions 5b that loosely engage notches 6b provided therefor in the end wall of one of the felt retaining shells 10 and the holder 11; and the portion 7b of the wire intermediate said coils is seated within a notch 8b, provided therefor in the end wall of the other felt retaining shell 10. The construction shown in Fig. 6 is similar to that shown in Fig. 5 and comprises three felt rings 9a and retaining shells 10a, a single holder 11a and separate right and left-hand helical coils 4e and 4f, respectively, that have outwardly bent end portions that fit within notches provided therefor in the end walls of the respective shells.

The construction shown in Figs. 7 to 10 is provided with a helical coil 4g made of steel wire 12 covered with Thiokol or other lubricant resisting material 13 of rectangular or other cross-sectional shape. This coil is mounted in an internal groove provided therefor in an annular casing of metal 14 that has a slot 15 therein through which the covered wire may be fed into place and removed. This slot is closed by a cover plate 17, which is removably secured to the casing by screws 18 and has a lug 17a thereon that extends through said slot into said casing. The coil 4g is positioned in the casing 14 with both ends opposite the slot 15 therein; and the lug 17a on the cover 17 is interposed between said ends. The coil may be backed with a ring 19 of felt, synthetic rubber or other suitable material which seats in the bottom of the coil receiving groove of the annular casing 14; or said coil may be seated directly in said groove, as shown in Fig. 11. When the felt backing 19 is used, a liner 20 of brass or other antifriction material is interposed between the backing and the coil so as to prevent slippage therebetween. Rotation of said liner is prevented by bending the ends 20a thereof outwardly into abutting relation with the ends of the slot 15 in the annular casing. In this construction, when the shaft is rotated in either direction, the leading end of the coil will abut against the lug 17a and the cover plate 17 and thus cause the coil to unwind slightly and permit slippage of the shaft in the coil.

What I claim is:

1. The combination with relatively rotatable inner and outer members, of a sealing device therefor, said sealing device comprising a ring mounted in said outer member and a helical coil mounted in said ring and having a tight frictional grip on said inner member and having its opposite ends loosely anchored in said ring, whereby said coil is adapted upon relative rotation of said members to unwind slightly, thereby relieving the tight fit of said coil on said inner member and thus permitting independent rotation of said members.

2. A device for sealing the space between relatively rotatable inner and outer members, said device comprising a ring adapted to be mounted in said outer member and a helical coil adapted to frictionally engage said inner member and mounted in said ring with its opposite ends extending loosely into recesses provided therefor in said ring.

3. A device for sealing the space between relatively rotatable inner and outer members, said device comprising a ring adapted to be mounted in said outer member and two reversely wound helical coils adapted to frictionally engage said inner member and seated in said ring with their ends extending loosely into recesses provided therefor in said ring.

4. A device for sealing the space between relatively rotatable inner and outer members, said device comprising a ring of elastic material adapted to be mounted in said outer member and a wire coil adapted to frictionally engage said inner member and formed of a single length of wire mounted in said ring with its opposite ends extending loosely into recesses provided therefor in said ring, the opposite end portions of said coil being reversely wound.

5. A device for sealing the space between relatively rotatable inner and outer members, said device comprising a ring adapted to be mounted in said outer member and a helical coil adapted to frictionally engage said inner member and mounted in said ring with its opposite ends extending loosely into recesses provided therefor in said ring, said coil comprising a steel wire and a covering of antifriction material.

6. A device for sealing the space between relatively rotatable inner and outer members, said device comprising an annular casing of metal adapted to be mounted in said outer member, an annular member of nonmetallic material mounted in said casing, and a helically wound wire adapted to frictionally engage said inner member and mounted in said nonmetallic member with its opposite end portions bent outwardly and loosely engaged in recesses provided therefor in said casing.

7. A device for sealing the space between relatively rotatable inner and outer members, said device comprising a metal ring adapted to be mounted in said outer member and having an opening in the side thereof and a helical coil adapted to frictionally engage said inner member and mounted in said ring with its opposite ends loosely engaging recesses provided therefor in said ring, said coil comprising a length of wire adapted to be inserted in and removed from said ring through said opening.

WILLIAM J. CHIEVITZ.